July 31, 1934.　　　　S. M. COFFMAN　　　　1,968,635
FREEWHEELING TRANSMISSION MECHANISM
Filed Feb. 8, 1932　　　4 Sheets-Sheet 2
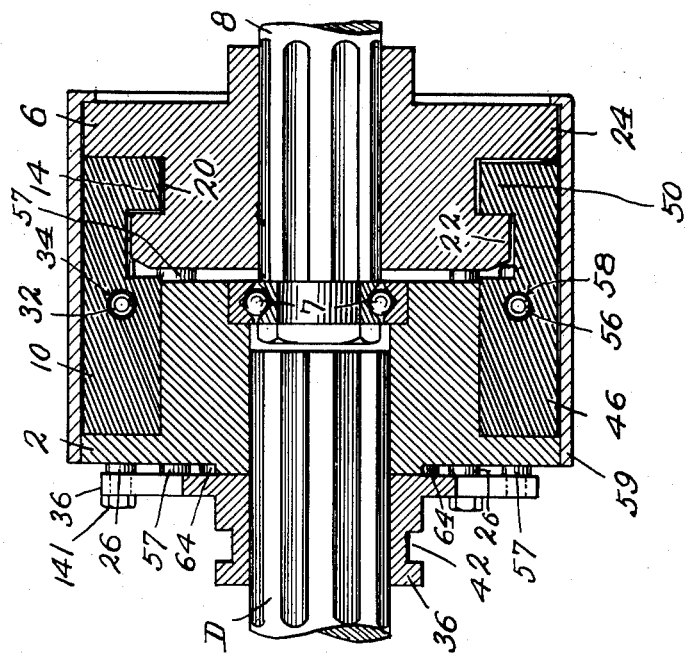
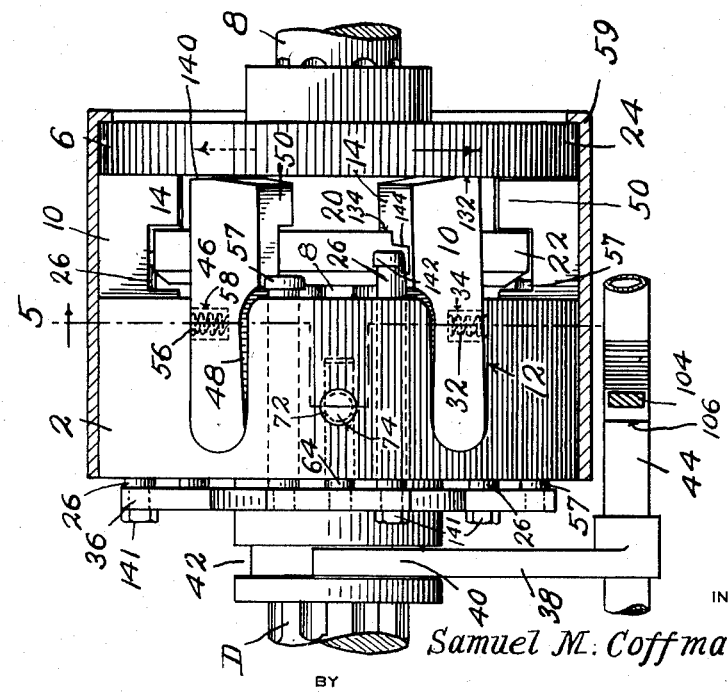
INVENTOR:
Samuel M. Coffman,
BY
F. G. Fischer,
ATTORNEY.

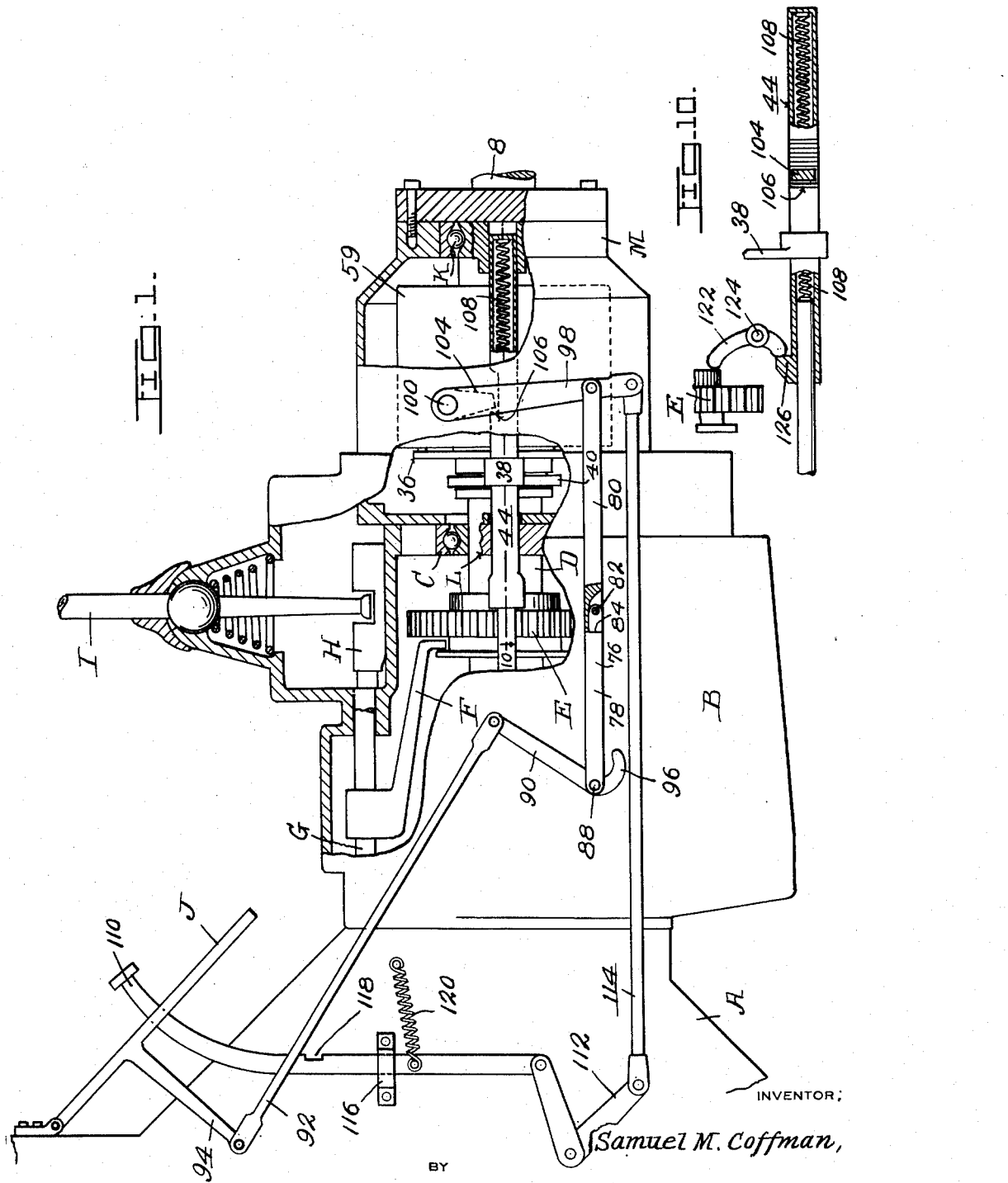

July 31, 1934.  S. M. COFFMAN  1,968,635
FREEWHEELING TRANSMISSION MECHANISM
Filed Feb. 8, 1932    4 Sheets-Sheet 3
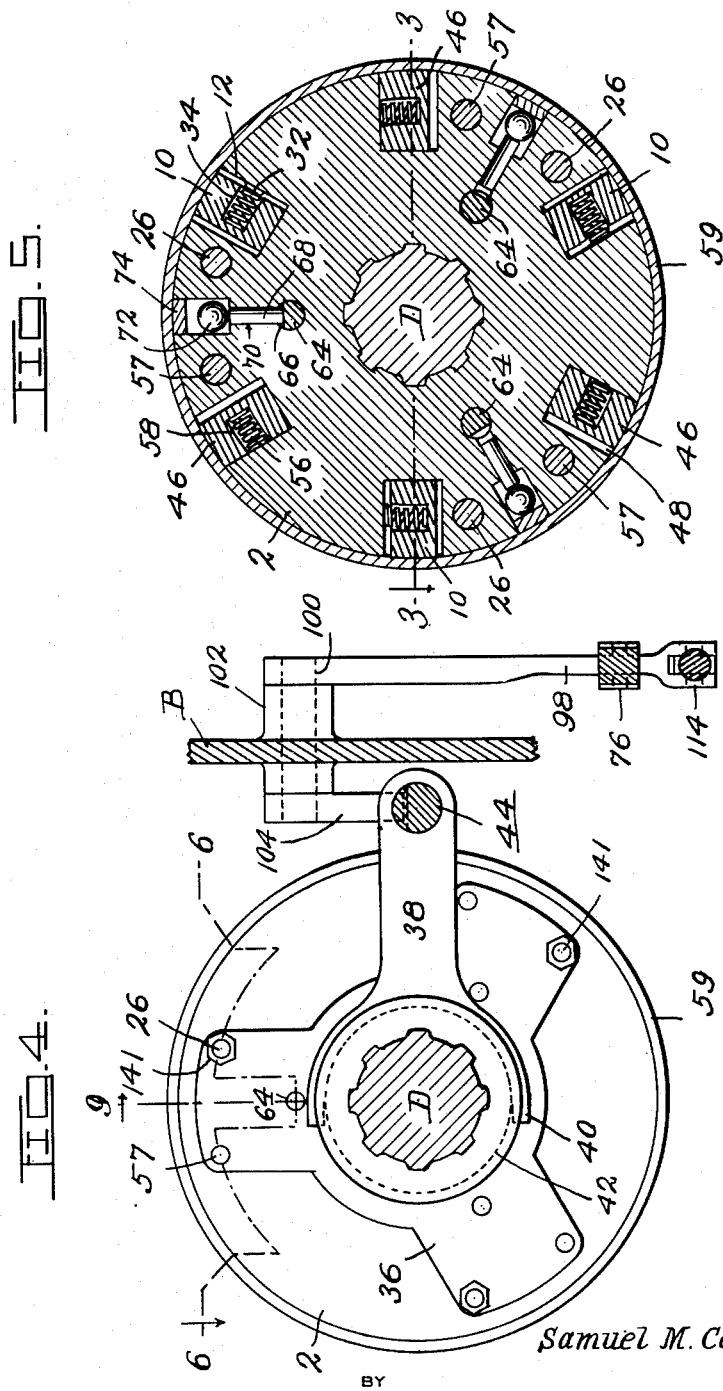
INVENTOR:
Samuel M. Coffman,
BY
F. G. Fischer,
ATTORNEY.

July 31, 1934.   S. M. COFFMAN   1,968,635
FREEWHEELING TRANSMISSION MECHANISM
Filed Feb. 8, 1932   4 Sheets-Sheet 4
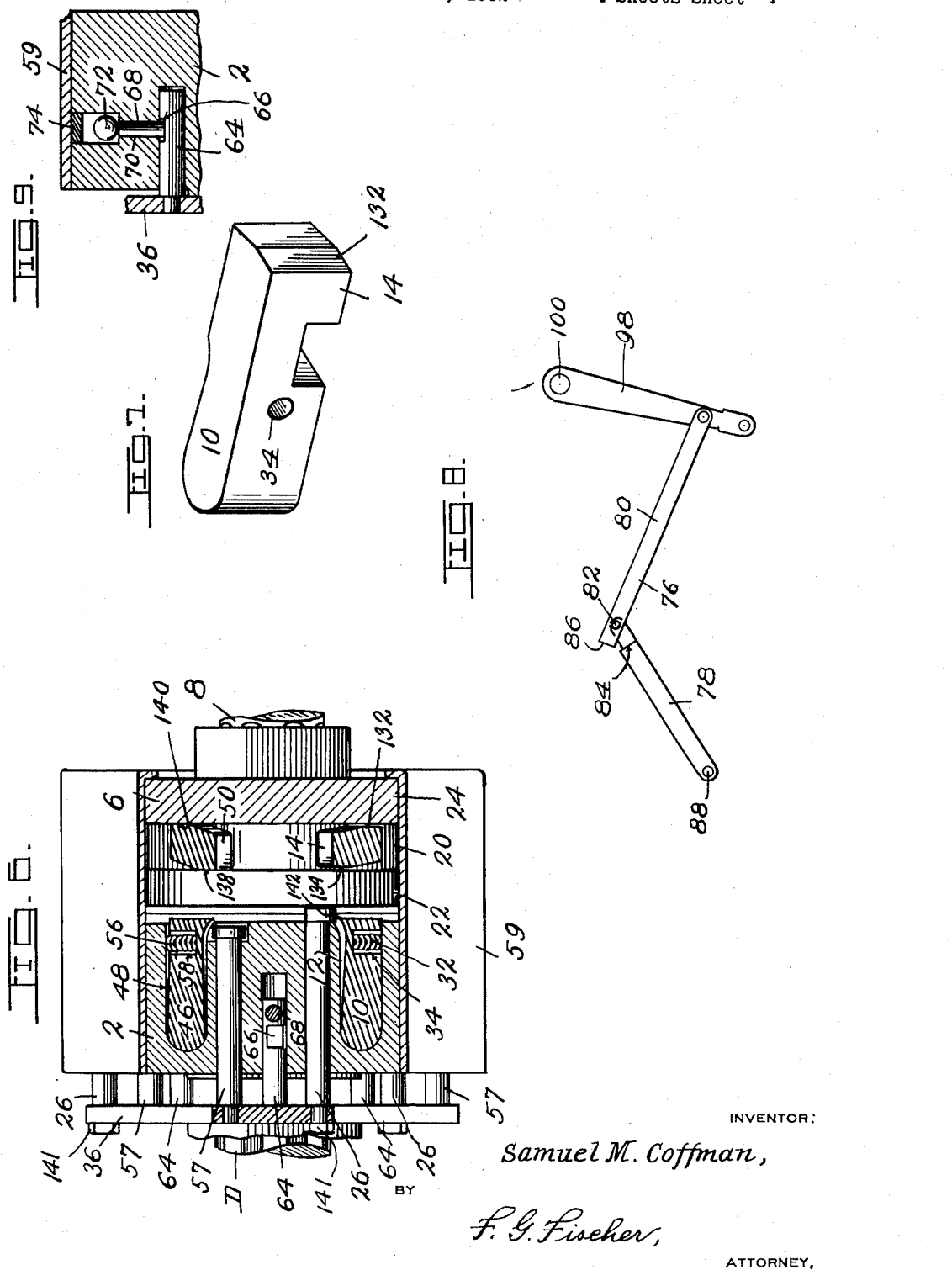
INVENTOR:
Samuel M. Coffman,
BY
F. G. Fischer,
ATTORNEY.

Patented July 31, 1934

1,968,635

UNITED STATES PATENT OFFICE 1,968,635

FREEWHEELING TRANSMISSION MECHANISM

Samuel M. Coffman, Kansas City, Mo.

Application February 8, 1932, Serial No. 591,645

19 Claims. (Cl. 192—.01)

My invention relates to a free wheeling transmission device and while it is applicable to a variety of machines, it is especially useful for automotive vehicles where all of the advantages of a device of this character may be had by letting the vehicle coast while the engine is idling.

One object of the invention is the production of a novel free wheeling unit of simple, strong and durable construction, which is positive and reliable in operation and free from back-lash and lost motion.

A further object is the provision of primary locking means whereby, in the event the engine stops when the vehicle is free wheeling, the device is automatically locked in free wheeling position and cannot be adjusted to conventional driving position until the engine is started, thereby avoiding the danger of injury to the passengers and damage to the vehicle from changing to conventional driving position when the engine is dead and the vehicle is free wheeling at high speed.

Another object is the provision of auxiliary locking means which prevents the device being adjusted from free wheeling to conventional driving position until the engine, if idling, has been accelerated to synchronize with the speed of the coasting vehicle, thereby enabling the change from the former to the latter position to be made without subjecting the transmission mechanism to shock or sudden strain.

Other objects will hereinafter appear and in order that the invention may be fully understood reference will now be had to the accompanying drawings, in which:

Fig. 1 is a broken side elevation partly in section of an automotive engine and transmission mechanism equipped with my free wheeling unit.

Fig. 2 is a plan view partly in section of the free wheeling unit.

Fig. 3 is a horizontal section of the free wheeling unit on line 3—3 of Fig. 5.

Fig. 4 is a front elevation of the unit with one of the shafts upon which it is mounted in cross section.

Fig. 5 is an irregular cross section on line 5 of Fig. 2.

Fig. 6 is an irregular section on line 6—6 of Fig. 4.

Fig. 7 is a detail perspective view of one of a plurality of clutch members employed in carrying out the invention.

Fig. 8 is a side elevation of an auxiliary locking device forming a part of the invention.

Fig. 9 is a fragmentary section of primary locking means on line 9 of Fig. 4.

Fig. 10 is a fragmentary horizontal section on line 10 of Fig. 1.

Referring to the drawings, A designates the rear portion of an automotive engine equipped with the usual transmission case B having bearings C in which the ordinary transmission shaft D is journaled. The shaft D is equipped with the usual gear wheels only one of which, the first and reverse gear wheel E is shown. The gear wheel E is shifted on the shaft D in the usual manner by means of the gear shift fork F which is mounted upon the shift bar G connected in the usual way to the controlling bar H actuated by the shift lever I.

Referring now more particularly to the free wheeling unit forming the present invention, 2 designates a driving member fixedly mounted upon the shaft D, in axial alinement with a driven member 6 fixedly mounted upon a shaft 8 which is usually coupled to the propeller shaft of the transmission mechanism. The shaft 8 is mounted in a bearing 7 in the driving member 2 and a bearing K in the transmission case B.

10 designates a set of primary clutch members for driving the driven member 6 forwardly. Said clutch members 10 are operably mounted in equally spaced recesses 12 formed in the driving member 2 and preferably arranged in parallelism with the axis of said driving member, as shown by Figs. 2 and 6. The clutch members 10, which in the present instance are three in number, are provided at their free ends with fixed jaws 14 which project into an annular groove 20 formed between circular flanges 22 and 24 extending circumferentially around the driven member 6 with which they are preferably formed integral as shown more clearly by Fig. 3.

The clutch members 10 are controlled by respective arms 26 and coil springs 32, the former of which are adapted to hold said clutch members in inactive position while said springs 32 are adapted to hold the clutch members in active position, as will hereinafter appear. The springs 32 are mounted in cavities 34 formed in the respective clutch members 10 and press against the adjacent faces of the recesses 12.

The arms 26 are slidably mounted in the driving member 2 and secured to a yoke 36 which is splined upon the shaft D in order that it may slide longitudinally upon and be driven by said shaft. Since it is not desirable to hold the clutch members 10 inactive when the unit is applied to automotive vehicles the arms 26 may either be dispensed with or adjusted, in a manner hereinafter described, to the position shown by Fig. 2, so their operation will have no effect on said clutch members 10. The yoke 36 is controlled by a shifting member 38 having a forked end 40 projecting into a peripheral groove 42 formed in the hub of the yoke. The opposite end of the shifting member 38 is fixedly mounted upon a bar 44 slidably mounted in a support L and the rear end M of the transmission case B. Means for operating the bar 44 will be hereinafter described.

46 designates a secondary set of clutch members for driving the driven member 6 backwardly and also for coacting with the primary clutch members 10 in securing the unit in conventional driving position when desired. Said clutch members 46 are preferably equal in number to the clutch members 10 and spaced equidistant therefrom. The clutch members 46 are mounted in recesses 48 formed in the driving member 2 and preferably arranged in parallelism with the axis of said driving member. The clutch members 46 are provided at their free ends with fixed jaws 50 which project into the groove 20 in the driven member 6. Spring means 56 and arms 57 are employed for controlling the clutch members 46 as will hereinafter appear. The springs 56 are located in cavities 58 formed in the clutch members 46 and yieldably hold the latter in active position by pressing against the adjacent sides of the recesses 48.

The arms 57 are slidably mounted in the driving member 2 and secured at one end to the yoke 36 whereby they are controlled. A housing 59 is firmly secured in position upon the driving member 2 and loosely embraces the driven member 6. Said housing 59 holds the clutch members 10 and 46 in their respective recesses 12 and 48 and excludes dust and other foreign matter likely to interfere with the proper operation of said clutch members and the other internal working parts of the unit.

In order to aviod injury to the occupants of the vehicle and damage to the transmission mechanism, I have provided primary locking means for automatically securing the unit in free wheeling position so that it can not be adjusted to conventional driving position should the engine stop while the vehicle is coasting. I have also provided manually controlled auxiliary locking means for securing the unit in free wheeling position when there is a wide difference between the speed of the engine and the vehicle, in order to avoid the shock and strain which would otherwise occur if the unit were adjusted to conventional driving position while the engine was idling and the car was coasting at relatively high speed.

The drawings disclose a satisfactory form of primary locking means including a number of equally spaced bolts 64 slidably mounted in the driving member 2 and secured at their outer ends to the yoke 36. The inner portions of the bolts 64 have notches 66 for the reception of the inner ends of tumblers 68 slidably mounted in radial counterbores 70 formed in the driving member 2. A sufficient number of bolts 64 and tumblers 68 are employed to insure at least one tumbler being adjusted by the force of gravity into active position in the notched portion 66 of the respective bolt 64 (see upper part of Fig. 5), after the engine has stopped. To insure positive operation of the tumblers 68 in the event the engine stops and leaves the driving member 2 in such position that the uppermost tumbler 68 happens to extend at such angle that the force of gravity alone is insufficient to force it into active position, I provide balls 72, which being free to roll, will accomplish that purpose. One ball 72 is provided for each tumbler 68 and is located in the enlarged outer end of the respective counterbore 70 which is closed by a plug 74.

After the engine has been started the tumblers 68 and the balls 72 are thrown out of active position by centrifugal force and release the bolts 64. However, the unit is still held in free wheeling position by the auxiliary locking means until the engine has been speeded up to vehicle speed in the usual manner by depressing the accelerator pedal J.

The auxiliary locking means comprises, in the present instance, a jointed bar 76 consisting of two sections 78—80 connected by a pivot 82 and provided with square shoulders 84 and 86, respectively, which are adapted to abut each other and hold the bar 76 in active position until the accelerator pedal J is depressed.

The forward end of the bar 76 is pivotally mounted upon a stud 88 projecting from the adjacent side of the transmission case B. Also pivotally mounted upon said stud 88 is a lever 90 which is operably connected to the accelerator pedal J through the intermediary of a connecting rod 92 and an arm 94, which latter depends from the pedal J. The lever 90 is provided at its lower end with a lug 96 which projects rearwardly beneath the forward portion of the bar 76 for the purpose of engaging the same and lifting it to the inactive position shown by Fig. 8. As disclosed by Fig. 1, the free end of the lug 96 is spaced a slight distance from the under side of the bar 76 to enable the accelerator pedal J to be depressed sufficiently to speed up the engine to vehicle speed before said lug 96 engages and breaks the bar 76.

After the bar 76 has been broken at the joint 82, Fig. 8, by depression of the accelerator pedal J, the unit may be adjusted to and held in conventional driving position by manually controlled means including a push rod 110, connected to a lever 98 through the intermediary of a bell crank 112, and a connecting rod 114. The lever 98 is pivotally connected to the auxiliary lock bar 76 and fixedly mounted at its upper end upon the outer end of a rock shaft 100 mounted in a bearing 102 formed on the adjacent side of the transmission case B. The inner end of the rock shaft 100 extends into the transmission case B and is provided with a fixedly mounted arm 104, the lower end of which is adapted to engage a shoulder 106 formed upon the bar 44, which latter is normally urged backwardly by a coil spring 108 to adjust the unit for free wheeling operation. The push-rod 110 has a notched portion 118 which engages a guide 116 and holds the push-rod when depressed in conventional driving position. A coil spring 120 is employed for yieldably holding the notched portion 118 in engagement with the guide 116.

By connecting the push-rod 110 to the lever 98 as above stated, it is apparent that said push-rod cannot be operated to adjust the unit to conventional driving position except when the accelerator pedal J is depressed to speed up the engine and break the bar 76 at the joint 82. Breaking of the bar 76 as stated swings the lever 98 forward but not far enough to carry the arm 104 into engagement with the shoulder 106, and hence the unit remains in free wheeling position until adjusted for conventional driving through the greater movement of the lever 98 imparted thereto by the push rod 110 when forced downwardly.

I have also provided means for adjusting the free wheeling unit to conventional driving position when the gear E is shifted backward for engagement with the reverse gear, not shown, on the usual countershaft, of the transmission mechanism when it is desired to drive the car backwardly. As shown on Fig. 10 said means comprises a lever 122 fulcrumed at 124 and having one end bearing against the hub of the gear wheel E and its opposite end against a shoulder 126 formed on the bar 44. With the foregoing arrangement it is apparent that when the gear wheel E is shifted backwardly from the neutral position disclosed by Fig. 1, it causes the lever 122 to shift the bar 44 forwardly, and through the intermediary of the shifting member 38, adjust the yoke 36 to the conventional driving position shown by Fig. 6. The foregoing operation may be accomplished without breaking the auxiliary lock bar 76 as the bar 44 is moved in such direction that the shoulder 106 is carried away from the arm 104.

In practice, when the unit is adjusted to free wheeling position as disclosed by Figs. 1 and 2, and the engine is pulling the vehicle, the operation briefly stated is as follows: The clutch members 46 are held in inactive position or approximately parallel with the axis of the driving and driven members 2 and 6 against the action of the springs 56 by means of the arms 57 as shown by Fig. 2, while the clutch members 10 are held slightly at an oblique angle to said axis by the springs 32, so that the beveled face portions 132 and 134 of the jaws 14 will become wedged against the adjacent sides of the flanges 22 and 24, respectively, and drive the driven member 6 forwardly with the driving member 2. However, should the driver adjust the engine to idling position when descending a hill the coasting vehicle will drive the driven member 6 faster than the driving member 2 is being driven by the engine and cause the flanges 22 and 24 to run ahead of the respective engaging surfaces of the jaws 14. Should the engine stop while the vehicle is coasting the force of gravity immediately acts upon the tumblers 68 and the balls 72, so that not less than one tumbler will automatically enter the notched portion 66 of the associated bolt 64 and thus lock the unit in free wheeling position until the engine is started. When the engine is started the tumblers 68 and the balls 72 are thrown out of engagement with the respective bolts 64 by centrifugal force but the unit is still held in free wheeling position by the auxiliary locking mechanism, including the jointed bar 76, until the accelerator pedal J is actuated to speed up the engine and the push rod 110 is shoved downwardly to adjust the unit to conventional driving position. As the push rod 110 is depressed the arms 57 are moved out of engagement with the clutch members 46 which are then immediately adjusted by the springs 56 into active position so that the surfaces 138 and 140 of the jaws 50 will positively engage the flanges 22 and 24, respectively, and prevent the driven member 6 from running ahead of the driving member 2. In other words the clutch members 10 and 46 cooperate in clutching the driving member 2 and the driven member 6 together for both forward and backward driving.

I have hereinbefore pointed out that when the unit is applied to an automotive vehicle it would be preferable to adjust the arms 26 to the position shown by Fig. 2, so that their back and forth movements would have no effect on the primary clutch members 10. However, when the unit is used with certain kinds of machinery it may be desirable at times to drive the member 6 backward and leave it free to run ahead of the drive member 2. This may be accomplished by loosening nuts 141 which clamp the arms 26 to the yoke 36 and then axially rotating the arms 26 far enough to carry their shoulders 142 into engagement with the respective clutch members 10 to hold the same in the inactive position disclosed by Fig. 6. In order, however, that the clutch members 10 may be utilized in driving the driven member 6 forwardly when desired said clutch members 10 are provided with recesses 144 for the reception of the shoulders 142 when the arms 26 are adjusted inwardly to the position disclosed by Fig. 2. This frees the clutch members 10 from the shoulders 142 and permits the springs 32 to restore said clutch members to active position.

From the foregoing description it is apparent that I have provided a free wheeling unit which is well adapted for the purpose intended, and while I have shown and described one form of said unit I reserve all rights to such changes and modifications thereof as properly fall within the spirit and scope of the invention as claimed.

Having thus described my invention, what I claim and desire to secure by Letters Patent, is:

1. A free wheeling unit comprising rotary driving and driven means, primary clutch means through which said driving means rotates said driven means in a forward direction and permits the latter to run ahead of the driving means, secondary clutch means through which the driving means may rotate the driven means in a reverse direction and which is adapted to cooperate with the primary clutch means in causing said driven means to rotate forward or backward in unison with the driving means, suitably controlled means for holding the secondary clutch means inactive to permit free wheeling operation of the unit, and locking means for securing said holding means in active position, said holding means being adjusted to active position by the force of gravity.

2. A free wheeling unit comprising rotary driving and driven means, primary clutch means through which said driving means rotates said driven means in a forward direction and permits the latter to run ahead of the driving means, secondary clutch means through which the driving means may rotate the driven means in a reverse direction and which is adapted to cooperate with the primary clutch means in causing said driven means to rotate forward or backward in unison with the driving means, suitably controlled means for holding the secondary clutch means inactive to permit free wheeling operation of the unit, and locking means for securing said holding means in active position, said locking means being releasable by centrifugal force.

3. A free wheeling unit comprising rotary driving and driven members, primary clutch means through which said driving member rotates said driven member in a forward direction and permits the latter to run ahead of the driving member, secondary clutch means through which the driving member may rotate the driven member in a reverse direction and which is adapted to cooperate with the primary clutch means in causing said driven member to rotate forward or backward in unison with the driving member, suitably controlled means for holding the secondary clutch means inactive to permit free wheeling operation of the unit, and locking means carried by the driving member for securing said holding means in active position, said locking means being adjusted to active position by the force of gravity and to inactive position through centrifugal force.

4. A free wheeling unit comprising rotary driving and driven means, primary clutch means through which said driving means rotates said driven means in a forward direction and permits the latter means to run ahead of the driving means, secondary clutch means through which the driving means may rotate the driven means in a reverse direction and which is adapted to cooperate with the primary clutch means in driving said driven clutch means forward or backward in unison with the driving means, suitably controlled means for holding the secondary clutch means inactive to permit free wheeling operation of the unit, and suitably controlled tumblers for securing said holding means in active position.

5. A free wheeling unit comprising rotary driving and driven members, primary clutch means through which said driving member rotates said driven member in a forward direction and permits the latter member to run ahead of the driving member, secondary clutch means through which the driving member may rotate the driven member in a reverse direction and which is adapted to cooperate with the primary clutch means in driving said driven member forward or backward in unison with the driving member, suitably actuated means for holding the secondary clutch means inactive to permit free wheeling operation of the unit, and tumblers for securing said holding means in active position, said tumblers being adjusted to active position by the force of gravity.

6. A free wheeling unit comprising rotary driving and driven means arranged in axial alinement, primary clutch means though which said driving means rotates said driven means forwardly and permits the latter means to run ahead of the driving means, secondary clutch means through which the driving means may rotate the driven means in a reverse direction and which is adapted to cooperate with the primary clutch means in driving said driven means forward or backward in unison with the driving means, suitably controlled means for holding the secondary clutch means inactive to allow free wheeling operation of the unit, and tumblers for securing the holding means in active position, said tumblers being releasable from said holding means by centrifugal force.

7. A free wheeling unit comprising rotary driving and driven members, primary clutch means through which said driving member rotates said driven member in a forward direction and permits the latter member to run ahead of the driving member, secondary clutch means through which said driving member may rotate the driven member in a reverse direction and which is adapted to cooperate with the primary clutch means in driving said driven member forward or backward in unison with the driving member, suitably actuated means for holding the secondary clutch means inactive to permit free wheeling operation of the unit, and tumblers mounted in the driving member, said tumblers being adjusted to active position by the force of gravity and to inactive position by centrifugal force.

8. A free wheeling unit comprising rotary driving and driven means, primary clutch means through which said driving means rotates said driven means in a forward direction and permits the latter means to run ahead of the driving means, secondary clutch means through which the driving means may rotate the driven means in a reverse direction and which is adapted to cooperate with the primary clutch means in driving said driven means forward or backward in unison with the driving means, suitably controlled means for holding the secondary clutch means inactive to permit free wheeling operation of the unit, tumblers slidably mounted in the driving means for locking said holding means in active position, and rolling means mounted in the driving means and adapted to coact with the force of gravity and the weight of the tumblers in adjusting the latter to active position when the driving means is at rest, said tumblers and rolling means being adjusted to inactive position by centrifugal force when the driving means is in operation.

9. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction and which is adapted to cooperate with the primary clutch means in driving said driven means forward or backward in unison with the driving means, arms for holding the secondary clutch means inactive to permit free wheeling operation of the unit, means for moving said arms to active and inactive positions, a bolt movable with said arms, and an automatically actuated tumbler in the driving means adapted to hold said bolt from movement and thereby secure the arms in active position when the driving means is at rest.

10. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction and which is adapted to cooperate with the primary clutch means in driving said driven means forward or backward in unison with the driving means, means for holding the secondary clutch means inactive to effect free wheeling operation of the unit in a forward direction, suitable locking means mounted in the driving means and adapted to secure said holding means in active position when the driving means is at rest, means for controlling said holding means after the latter has been released by the locking means, spring means for moving said controlling means in a direction to adjust the holding means to active position, and manually actuated means for moving said controlling means in a reverse direction to adjust the holding means to inactive position to effect conventional driving of the unit.

11. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction, means for holding the secondary clutch means inactive to permit free wheeling operation of the unit, a yoke for actuating said holding means, a shifting member for actuating said yoke, a bar for actuating said shifting member, spring means for adjusting said bar in a direction to effect free wheeling operation of the unit, an arm for moving said bar in a reverse direction to effect conventional operation of the unit, a lever for actuating said arm, and manually controlled means for actuating said lever.

12. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction, means for holding the secondary clutch means inactive to permit free wheeling operation of the unit, a yoke for actuating said holding means, a shifting member for actuating said yoke, a bar for actuating said shifting member, spring means yieldably holding said bar in position for free wheeling operation of the unit, a push rod, and means controlled by said push rod for moving the bar to a position for conventional operation of the unit.

13. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction, means for holding the secondary clutch means inactive to permit free wheeling operation of the unit, a yoke for controlling said holding means, a shifting member for controlling said yoke, a bar for actuating said shifting member, spring means for yieldably holding said bar in position to permit free wheeling operation of the unit, a push rod, means controlled by said push rod for moving the bar to position for conventional operation of the unit, and manually controlled means for locking said push rod controlled means in inactive position to permit free wheeling of the unit.

14. In combination with the transmission mechanism of an automotive vehicle, a free wheeling unit comprising a driving member fixedly mounted upon the transmission shaft, a shaft arranged in axial alinement with said transmission shaft, a driven member fixedly mounted upon said alined shaft, primary clutch means through which said driving member rotates said driven member forwardly, secondary clutch means through which the driving member may rotate the driven member in a reverse direction, holding means operably mounted in the driving member for securing the secondary clutch means in inactive position to permit free wheeling operation of the unit, actuating means adapted to be adjusted by the first and reverse gear wheel of the transmission mechanism in a direction to shift said holding means to inactive position, and spring means for shifting said actuating means in a direction to restore the holding means to active position.

15. In combination with the transmission and accelerator mechanisms of an engine, a free wheeling unit comprising rotary driving means actuated by the transmisson mechanism, driven means, arranged in axial alinement with said driving means, primary clutch means through which said driving means rotates said driven means forwardly and permits the latter to run ahead of the driving means, secondary clutch means through which the driving means may rotate the driven means in a reverse direction, means for holding said secondary clutch means inactive to permit free wheeling operation of the unit, manually controlled means for shifting and securing said holding means in inactive position to insure conventional operation of the unit, locking means including a jointed bar for securing said manually controlled means in inactive position, and means controlled by the accelerator mechanism for adjusting said locking means to inactive position.

16. A free wheeling unit comprising rotary driving and driven means, primary clutch means through which said driving means rotates said driven means forwardly, and permits the latter means to run ahead of the driving means, secondary clutch means through which the driving means may rotate the driven means in a reverse direction, means for holding the secondary clutch means inactive to permit free wheeling operation of the unit, manually controlled means for shifting and securing said holding means in inactive position to insure conventional operation of the unit, locking means including a jointed bar with shoulders for securing said manually controlled means in inactive position, and means for adjusting said locking means to inactive position.

17. A free wheeling unit comprising rotary driving and driven means, primary clutch means through which said driving means rotates said driven means forwardly and permits the latter means to run ahead of the driving means, secondary clutch means through which the driving means may rotate the driven means in a reverse direction and which is adapted to cooperate with the primary clutch means in driving said driven means forward or backward in unison with the driving means, suitably controlled means for holding the secondary clutch means inactive to permit free wheeling operation of the unit, means controlled by gravity and centrifugal force for locking and unlocking said holding means when in active position, and spring means for adjusting the secondary clutch means to active position when released by the holding means.

18. A free wheeling unit comprising rotary driving and driven means, primary clutch means through which said driving means rotates said driven means forwardly and permits the latter to run ahead of the driving means, secondary clutch means through which the driving means may drive the driven means backwardly, element whereby said secondary clutch means may be held inactive to permit free wheeling of the unit in a forward direction, members provided with shoulders and adapted to be manually rotated axially to cause said shoulders to adjust the primary clutch means to inactive position to permit backward driving of the unit by the secondary clutch means, and manually controlled means for simultaneously moving said elements to active and said members to inactive position, or vice versa.

19. In combination with an automotive engine and the accelerator and transmission mechanisms associated with said engine, a free wheeling unit comprising a driving member actuated by said transmission mechanism, a driven member arranged in axial alinement with said driving member, primary clutch means through which said driving member drives said driven member forwardly and permits the latter to run ahead of the driving member, secondary clutch means through which the driving member may drive the driven member in a reverse direction, spring means tending to force said secondary clutch means into active position, means mounted in the driving member for holding said secondary clutch means inactive to permit free wheeling operation of the unit, primary locking means mounted in the driving member for securing said holding means in active position when the unit is at rest, manually actuated means for moving said holding means to inactive position, and auxiliary locking means controlled by the accelerator mechanism for holding said manually actuated means inactive until the accelerator mechanism is operated to speed up the engine.

SAMUEL M. COFFMAN.